H. W. AILLS.
VEHICLE CURTAIN CONTAINER.
APPLICATION FILED MAY 8, 1920.
1,398,885.
Patented Nov. 29, 1921.
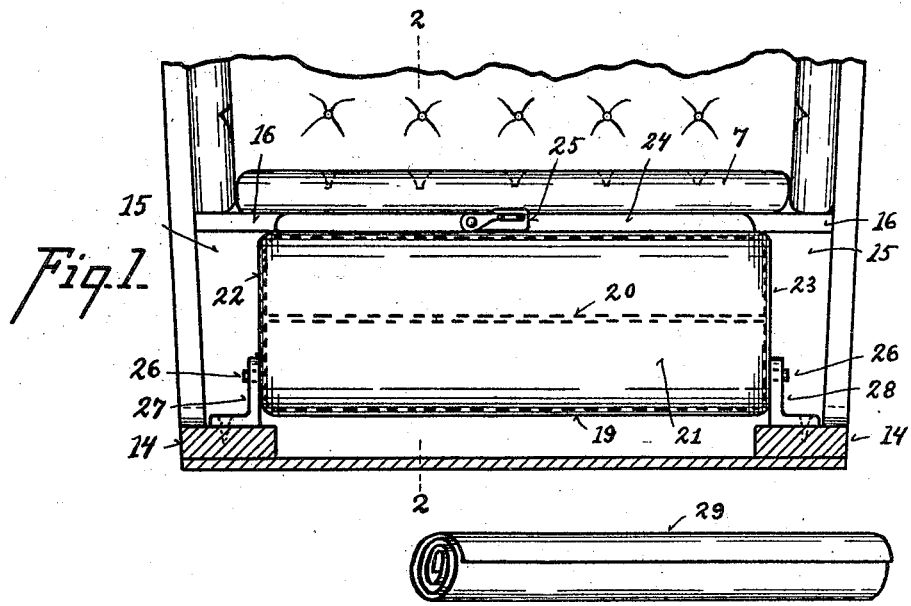
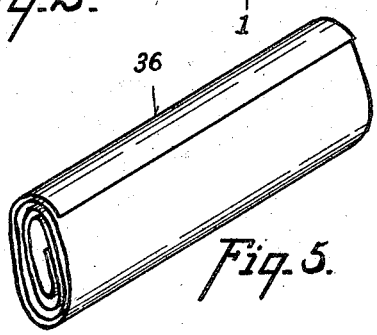
Inventor.
Harry W. Aills,
By C. W. Miles,
Attorney.

UNITED STATES PATENT OFFICE.

HARRY W. AILLS, OF CINCINNATI, OHIO.

VEHICLE-CURTAIN CONTAINER.

1,398,885. Specification of Letters Patent. Patented Nov. 29, 1921.

Application filed May 8, 1920. Serial No. 379,906.

*To all whom it may concern:*

Be it known that I, HARRY W. AILLS, a citizen of the United States, residing at Cincinnati, in the county of Hamilton and State of Ohio, have invented certain new and useful Improvements in Vehicle-Curtain Containers, of which the following is a specification.

My invention relates to improvements in curtain storage means for vehicles. One of its objects is to provide improved means for the storage of vehicle curtains in such manner that they are conveniently stored and removable from storage when required for use without inconvenience to the occupants of the vehicle. Another object is to provide an improved means for the storage of vehicle curtains in such manner that the curtains are not liable to be broken or injured, and are conveniently stored and removed from storage for use. Another object is to provide an improved detachable vehicle curtain storage container. My invention also comprises certain details of form, combination, and arrangement, all of which will be fully set forth in the description of the accompanying drawings, in which:

Figure 1 is a front elevation of a vehicle seat with my improved curtain storage receptacle applied thereto, taken on line 1—1 of Fig. 2.

Fig. 2 is vertical section through the vehicle seat and curtain storage receptacle, taken on line 2—2 of Fig. 1.

Fig. 3 is a view similar to Fig. 2 illustrating a modification.

Fig. 4 is a perspective view of a vehicle curtain rolled into a cylinder ready to be stored in one of the compartments of the container Fig. 2.

Fig. 5 is a perspective view of a vehicle curtain rolled into position to be conveniently stored in the container Fig. 3.

The accompanying drawings illustrate the preferred embodiments of my invention, in Figs. 1, 2, and 4 of which 14 represents the body or chassis, and 15 the vehicle seat, which may be either the forward or rear seat, preferably the rear seat. An upholstery cushion 7 mounted upon the seat frame is normally held against displacement forwardly by means of a sheet-metal cross rail 16. The curtain container 18 is preferably constructed of sheet-metal with a curved pocket 19 at its lower end, and a curved partition 20 near its center, and with a continuous front wall 21 and end sections 22 and 23. The upper portion of the front wall is curved or inclined rearwardly and has a plane-faced section 24 to abut against the cross rail 16 of the seat frame, and to be latched thereto by a latch or locking member 25. The curtain container is provided with pivotal studs 26 at opposite ends, preferably arranged concentrically with the curved outline of the lower curtain pocket, and said studs 26 journal in brackets 27 and 28 which are detachably secured to the chassis. The side of the curtain container adjacent to the seat frame is open, so that when the curtain container is in the position indicated in Fig. 2 in dotted line, the container rests upon the chassis and constitutes a tray upwardly open, from which the curtains 29 and 30 may be removed for use, or into which the curtains may be placed for storage when no longer required. For storage in the container, the curtains preferably in pairs are rolled into a cylindrical package, substantially as illustrated in Fig. 4, and in this form when placed in one of the pockets of the container, and the container closed as shown in full line in Fig. 2, there is practically no tendency to break, injure, or crease the curtains, due to the normal vibration of travel. When in the full line position of Fig. 2, the container is entirely closed, by the wall of the seat frame against which its open side is held and locked, thereby effectually protecting the curtains against dirt or injury. I preferably provide two curved pockets in the container as shown in Fig. 2, and store the curtains in the two cylindrical packages 29 and 30. The container is of comparatively little weight, is readily applied to any automobile or other vehicle, and is so positioned as not to interfere with the movements of the occupants, and is at the same time readily accessible when required.

In the modification Figs. 3 and 5, only one storage compartment 35 is provided in the container for the storage of the curtains, and the curtains, two or more in number are designed to be rolled into a package 36 substantially as illustrated in Fig. 5 and then introduced into the container, where they are safely held until again required for use.

The apparatus herein illustrated and described is capable of considerable modification without departing from the principle of my invention.

What I claim is:

1. In combination with a vehicle body seat frame, a curtain container having a curved lower portion to support the curtains, front and end sections, and a lip to engage and be latched to the seat frame, said container being pivotally attached to the vehicle body substantially co-axially with the curved lower portion, and forming with said vehicle body serving as one wall thereof, a closed container in one position and an open tray to discharge or receive the curtains in another position.

2. In combination with a vehicle body seat frame, a curtain container having a curved lower portion forming one curtain supporting pocket and a curved partition above said curved lower portion forming another curtain supporting pocket, front and end sections and a lip to engage and be latched to the upper portion of the seat frame, said container being pivotally attached to the vehicle body substantially co-axially with said lower curved portion and forming with said vehicle body a closed container in one position and an open tray to discharge or receive the curtains in another position.

In testimony whereof I have affixed my signature.

HARRY W. AILLS.